(12) United States Patent
Paquette

(10) Patent No.: US 7,017,517 B2
(45) Date of Patent: Mar. 28, 2006

(54) WASTE COLLECTION SYSTEM AND APPARATUS FOR FEEDERS

(76) Inventor: Nicole Paquette, 18 rue St-Alexandre, Gatineau (CA) J8V 1B1

( * ) Notice: Subject to any disclaimer, the term of this patent is extended or adjusted under 35 U.S.C. 154(b) by 0 days.

(21) Appl. No.: 10/616,956

(22) Filed: Jul. 11, 2003

(65) Prior Publication Data

US 2005/0005862 A1   Jan. 13, 2005

(51) Int. Cl.
*A01K 5/00* (2006.01)
*A01K 39/01* (2006.01)

(52) U.S. Cl. .................................. 119/51.01; 119/57.8

(58) Field of Classification Search ............ 119/51.01, 119/52.2, 52.3, 57.8, 57.9, 469, 467, 464, 119/432, 462, 479, 52.4, 55; 232/1 D, 14, 232/43, 43.3, 43.5; 248/161, 407, 408, 157
See application file for complete search history.

(56) References Cited

U.S. PATENT DOCUMENTS

| 1,144,157 | A | | 6/1915 | Stroup | |
| 1,370,167 | A | * | 3/1921 | Thompson | 109/46 |
| 1,646,086 | A | * | 10/1927 | Fleming | 232/43.2 |
| 1,662,171 | A | * | 3/1928 | Savery | 232/43.2 |
| 1,738,566 | A | * | 12/1929 | Fleming | 232/43.2 |
| 1,807,079 | A | * | 5/1931 | Wilmanns | 232/43.2 |
| 1,831,410 | A | * | 11/1931 | Hubert | 131/236 |
| 1,840,024 | A | * | 1/1932 | Dalton | 232/43.2 |
| 1,908,279 | A | * | 5/1933 | Baylis | 232/43.2 |
| 2,028,612 | A | * | 1/1936 | Kosvich | 119/469 |
| 2,114,027 | A | * | 4/1938 | McDonald | 248/159 |
| 2,440,783 | A | * | 5/1948 | Peart | 131/236 |
| 2,684,051 | A | * | 7/1954 | Philippe et al. | 119/417 |
| 3,107,650 | A | * | 10/1963 | Cass | 119/417 |
| D222,623 | S | * | 11/1971 | Simpson | D30/125 |
| 3,672,677 | A | | 6/1972 | Moore | |
| 3,730,139 | A | | 5/1973 | Moore | |
| 3,818,868 | A | | 6/1974 | Boehland, Jr. | |
| 4,031,856 | A | | 6/1977 | Chester | |
| 4,131,083 | A | | 12/1978 | Sokol et al. | |
| 4,181,612 | A | * | 1/1980 | Trail | 210/169 |
| 4,384,547 | A | * | 5/1983 | Mattox | 119/464 |

(Continued)

FOREIGN PATENT DOCUMENTS

GB          2362798          5/2001

(Continued)

OTHER PUBLICATIONS

Spring Valley Collectibles—DX Hanging Pole Info Sheet, Deluxe Hanging Bird Feeder Pole, Apr. 17, 2003, http://my.execpc.com/-spvalley/prodsht/model880.html.

(Continued)

*Primary Examiner*—Son T. Nguyen
(74) *Attorney, Agent, or Firm*—Shapiro Cohen

(57) ABSTRACT

An outdoor feeder apparatus for wild birds comprises a platform having at least one low point and constructed and arranged to be connected at a discharge opening at each low point to an inlet opening in a hollow support attachable to a base and adapted to provide an unobstructed substantially vertical downward waste discharge path from each discharge opening to a replaceable collection container provided within the base. A cover member is adapted to be maintained in spaced-apart relationship from the platform by a plurality of cover support members provides at selected points on an upper surface of the platform, and to provide vertical coverage over at least all of a horizontal plane connecting all points on a perimeter of the platform. A bird feed supply can be hung from an interior surface of the cover.

8 Claims, 7 Drawing Sheets

U.S. PATENT DOCUMENTS

| | | | |
|---|---|---|---|
| 4,572,107 A * | 2/1986 | Clarizo | 119/463 |
| 5,282,596 A | 2/1994 | White | |
| 5,282,765 A * | 2/1994 | Suzuki | 446/8 |
| 5,332,196 A | 7/1994 | Wright | |
| 5,507,242 A * | 4/1996 | LeBlanc et al. | 114/144 R |
| 5,533,466 A * | 7/1996 | Kohus et al. | 119/459 |
| 5,549,075 A * | 8/1996 | Golden | 119/57.92 |
| 5,642,687 A | 7/1997 | Nylen et al. | |
| 5,749,316 A * | 5/1998 | Deagan | 119/57.8 |
| 5,823,135 A | 10/1998 | Gilchrist et al. | |
| 5,878,537 A | 3/1999 | Flischel | |
| 5,881,675 A | 3/1999 | Shaffer | |
| 5,924,425 A * | 7/1999 | Luedecke | 131/231 |
| D432,278 S | 10/2000 | Navratil | |
| 6,186,355 B1 * | 2/2001 | Luedecke | 220/576 |
| 6,360,690 B1 * | 3/2002 | Canby | 119/52.2 |
| 6,386,142 B1 | 5/2002 | Holscher et al. | |
| 6,405,679 B1 | 6/2002 | Sonnek | |
| 6,543,383 B1 * | 4/2003 | Cote | 119/57.8 |
| 6,626,129 B1 * | 9/2003 | Schrader | 119/479 |

FOREIGN PATENT DOCUMENTS

| | | |
|---|---|---|
| WO | WO 84/02056 | 6/1994 |

OTHER PUBLICATIONS

Spring Valley Collectibles—Martin House Post Info Sheet, Heavy Duty Martin House Post, Apr. 17, 2003, http://my.execpc.com/-spvalley/prodsht/model745.html.

* cited by examiner

FIG. 5
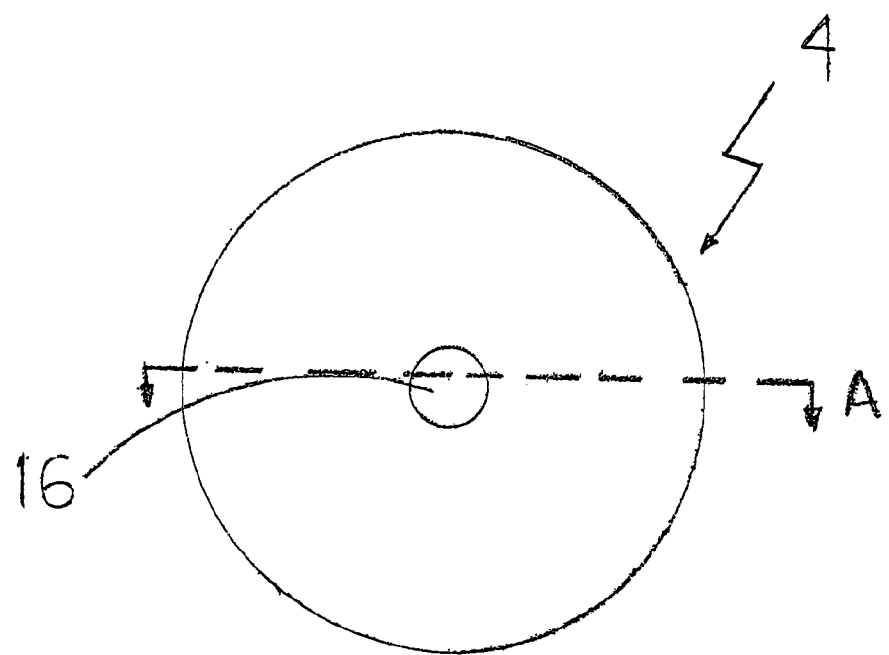
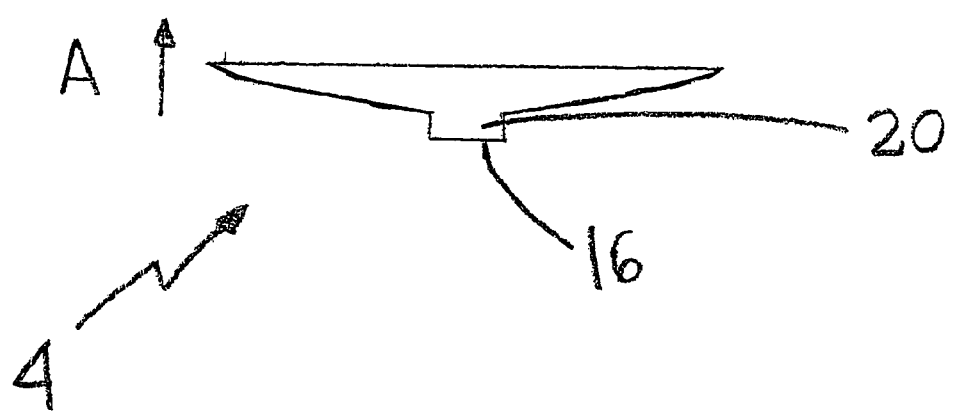

WASTE COLLECTION SYSTEM AND APPARATUS FOR FEEDERS

BACKGROUND OF THE INVENTION

1. Field of the Invention

The present invention relates to the field of waste collection systems and apparatus for feeders.

2. Description of the Prior Art

Feeding birds using feeder apparatuses results in a large amount of waste due to feed being taken out from the feeder and not consumed. Such waste can be in the form of unused seeds, husks, and the like. The waste can be produced by the birds for which the feeders are proposed, or by unwanted animals, which have access to the feeders. The waste emanating from the feeder usually falls on the area surrounding the feeder.

As the waste will be accumulated on the area surrounding the feeder, this causes the area to become messy and overrun with the unwanted waste. When the area includes a grass lawn, the result can be patches of dead or dying grass smothered by the waste.

Patents in the prior art disclose means to prevent unwanted animals from having access to feeders. For example U.S. Pat. No. 4,031,856, to Chester, discloses a squirrel-proof post including a feed platform mounted onto a supporting post and a sleeve mounted slidably along the supporting post. In U.S. Pat. No. 5,642,687, Nylen discloses a squirrel baffler consisting of a conical shaped sheet member and a bracket assembly; and in U.S. Pat. No. 5,878,537, Fischel discloses another squirrel-proof post for supporting a myriad of birdhouses or feeders. None of these patents disclose the use of a feed collecting system or apparatus to protect lawns or similar outdoor locations from accumulation of feed wastes.

Other patents describe birding systems, as in U.S. Pat. No. 6,386,142, where a modular pole system for birding is described by Holscher, and in WO 84/02056, Lussi discloses a birdhouse including a collector with a floor to make dirty food which has fallen in the collector, inaccessible to birds. The pole module disclosed by Holscher and the birdhouse of Lussi do not discuss the problems relating to protecting lawns or similar outdoors locations from waste emanating from a feeder.

The present invention therefore provides a bird feeder apparatus that protects the surrounding areas from waste emanating from the feeder by providing a waste collection system and apparatus.

The invention further provides means to prevent access to the feeder by unwanted animals.

SUMMARY OF THE INVENTION

The present invention seeks to solve the problem of feeding animals including, but not limited to, birds using feeder apparatuses, protecting the surrounding areas from waste emanating from the feeder by providing a feeder support apparatus for collecting and retaining waste feed, the apparatus comprising: a platform including at least one low point; an opening located within said at least one low point; a support at each low point having a first end and a second end, said support including a passageway between said first and said second ends; and a collection container located at said second end, wherein a path from said platform to said collection container via said passageway is substantially unobstructed, so as to allow flow of waste feed therethrough.

BRIEF DESCRIPTION OF THE DRAWINGS

FIG. 5 is a longitudinal partially cut away view of the saucer-shaped platform of the present apparatus.

DETAILED DESCRIPTION OF THE INVENTION

Figure 1:
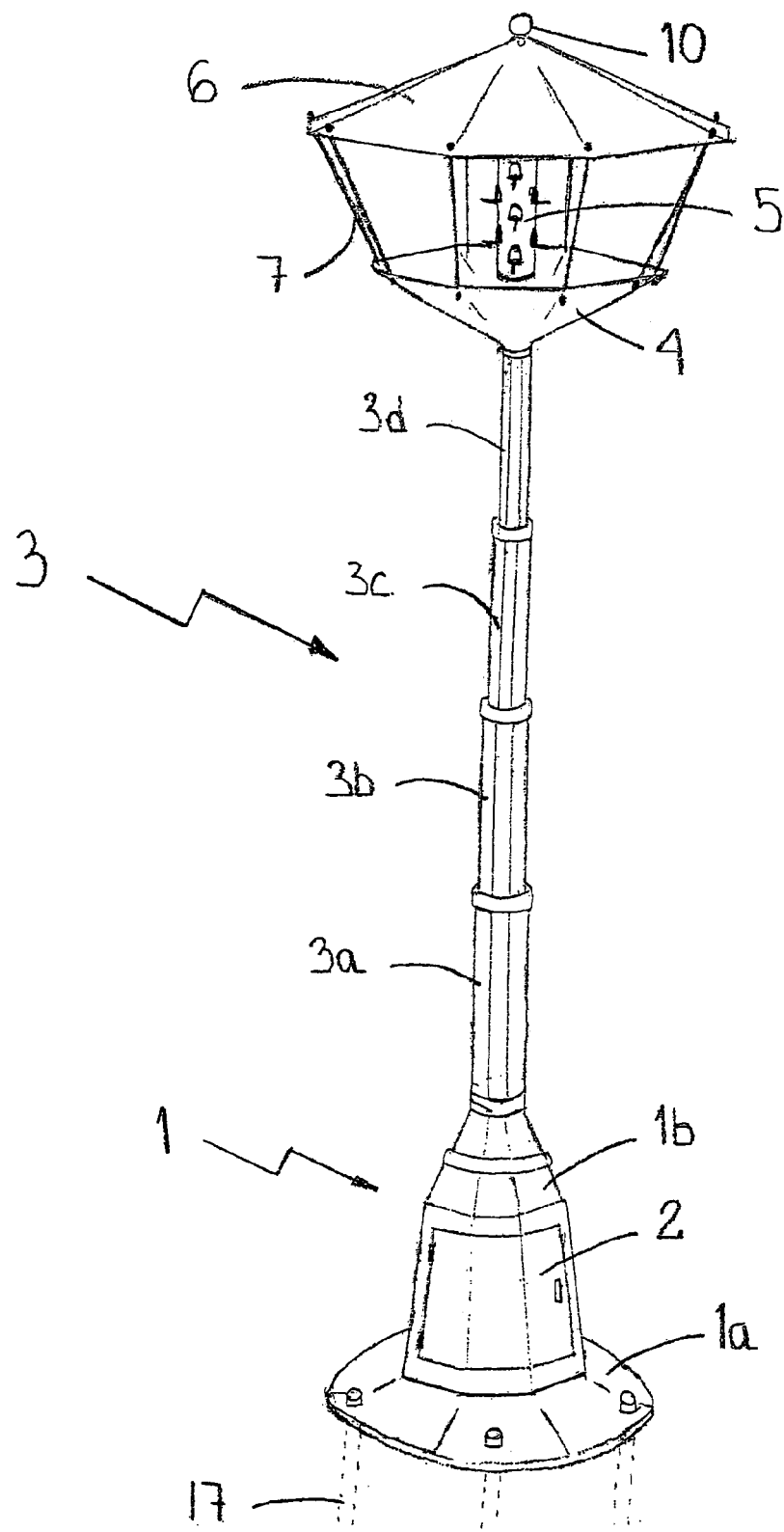
FIG. 1 is an isometric view of the apparatus according to the present invention.

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention includes an apparatus for use with a feeder that protects its surrounding areas from waste emanating from the feeder by capturing the waste in a collection container. According to the preferred embodiment of the present invention, the apparatus consists of a bottomless supporting base including a compartment large enough to shelter a collection container. The base is preferably fixed to the ground or platform such as a deck or patio surface by any suitable means including, but not limited to, stakes, screws, bolts, or the like. The apparatus also includes a support in the form of a hollow support tube and a platform in the form of a saucer-shaped platform having a low point. It should be understood that the platform could have more than one low point and therefore also include more than one hollow support without straying from the intended scope of the invention. For clarity, only a single low point and support is illustrated.

The platform may also include a stand or a hanging member to support a cover, or some similar roof or shield. The cover is fixed to the platform and arranged to suspend a bird feeder such that any waste derived from the bird feeder lands on the platform and is thus prevented from falling on the ground. The bird feeder may be mounted onto the apparatus from the platform or suspended by the cover. The cover also serves to protect the feeder from rain or snow. The hollow support tube includes a first end and a second end including a passageway between said first and said second ends. The hollow support tube may be completely or partially hollow so long as the passageway is substantially unobstructed for passage of waste therethrough. The support tube is coupled to a central opening at the low point of the saucer-shaped platform. This arrangement allows waste to migrate towards the low point and into the support tube. In general, the support tube should be held in a substantially vertical position to facilitate such migration of the waste. From time to time, a user can further facilitate such migration by using a garden hose or otherwise wash any waste down the tube in some similar manner.

The support tube is coupled on the end opposite the platform (i.e., second end) to a supporting base such that the hollow support forms a waste passageway from the platform to a collection container located at the second end to prevent wasted birdseeds and shells from falling on the ground. The hollow tube is a telescopic tube including multiple encasing sections. Each section is formed from nesting, concentric sections of increasing diameter where the largest diameter is at the second end (i.e., the base end). The telescoping aspect enables the user to adjust the height of the apparatus through extending and retracting the encasing sections. In use, the support tube may have pegs, pins, or any other suitable retention means, such as screws, bolts, grooves or fittings, for maintaining the multiple encasing sections and the telescoping support tube in an extended position and the apparatus in an upright position on the lawn. Thus, the relative distance of the bird feeder from ground level may also be adjusted. This allows for ease of use in either cleaning or filling of the bird feeder.

In the preferred embodiment, the supporting base includes a flat ring-shaped outer base with multiple holes and a centralized, bottomless round compartment with a door to enable the sheltered collection container to be reached. The base is made so that it is preferably fixed to the ground or platform such as a deck or patio surface by any suitable means including, but not limited to, stakes, screws, bolts, and the like.

The collection container is a bucket, a basket, or any other container made of suitable material and dimensions suitable to retain the waste and prevent weather related disturbances from emptying the collection container. The bottom part of the collection container is a mesh of an appropriate grade to prevent water from accumulating in the collection container and simultaneously capable of retaining the wasted material in the collection container. The mesh is preferably made of metal or some durable material suitable for exposure to the elements. Indeed, all parts of the present invention should be fabricated from suitable materials that are impervious to rust, temperature extremes, and wear and tear such as, but not limited to, aluminum, high impact plastic, and the like.

As mentioned above, the hollow telescopic support tube is coupled between the round base compartment and the opening in the low point of the platform to form a waste passageway from the platform to the collection container. The path from the platform to the collection container via the passageway is substantially unobstructed, so as to allow flow of waste feed therethrough. Moreover, the nested, concentric sections that form the support tube are nested with increasing diameters downwards from the platform to the container. This prevents collection of waste at the periphery where the each section connects to a larger section further facilitating flow through the passageway.

The apparatus is also useful in preventing small animals, such as squirrels, from accessing the bird feeder. This is because a squirrel will not be able to grasp the platform due to its saucer shape and due to its diameter, which should place the platform's periphery out of the grasp of animals. Preferably, the diameter should be at least 2 feet for such purpose.

The saucer-shaped platform includes a stand or a hanging member to support a roof fixed to the platform and to suspend the bird feeder. The roof is fixed to the platform using multiple rigid stems sufficiently spaced apart from one another to simultaneously sustain the roof and allow birds to easily have access to the feeder. The bird feeder is positioned relative to the platform such that the platform prevents waste derived from the bird feeder from falling on the lawn. The platform's floor is bowed down (i.e., convex) towards an opening within the low point, to collect the waste and direct such waste to fall inside the hollow tube and then be collected in the collection container.

As mentioned, the occasional pouring of water or hosing down the saucer and the passageway facilitates the movement of waste on the platform towards the central opening and through the passageway.

The bird feeder is any bird feeder known in the market suitable to be fixed in the platform, i.e., suspended from the roof.

The apparatus of the present invention may be relocated and mounted in another location at any time. Alternatively, the apparatus could be portable (i.e., not affixed) and so could be relocated at any time.

In use, it is preferable that the apparatus be placed far enough from trees, to avoid unwanted animal from jumping onto the feeder.

FIG. 1 shows the preferred embodiment of the apparatus, where a base (1) includes a flat ring-shaped outer base (1a), which can be fixed to the ground using hammered stakes (17), and (1b) is a central round compartment, with a small door (2) which enables a sheltered collection container (11 in FIG. 2) to be reached and emptied or replaced. A hollow telescopic support tube (3) is composed of a series of four encasing sections (3a, 3b, 3c and 3d) forming a passageway (8 in Fig.7). Height adjustment of the hollow telescopic support tube (3) is performed by sliding the encasing sections (3a, 3b, 3c and 3d), expanding and retracting them, and retaining the tube by means of pegs at the bottom edge (9a in FIG. 3) and holes at the upper edge (9b in FIG. 3) of each encasing section. A saucer-shaped platform (4) is coupled on the top of the supporting tube (3). A roof (6) is fixed to the platform (4) by multiples rigid stems (7), and a birdfeeder (5) is suspended under the roof attached to a decoration ball (10) that is on the peak of the roof.

Figure 2:
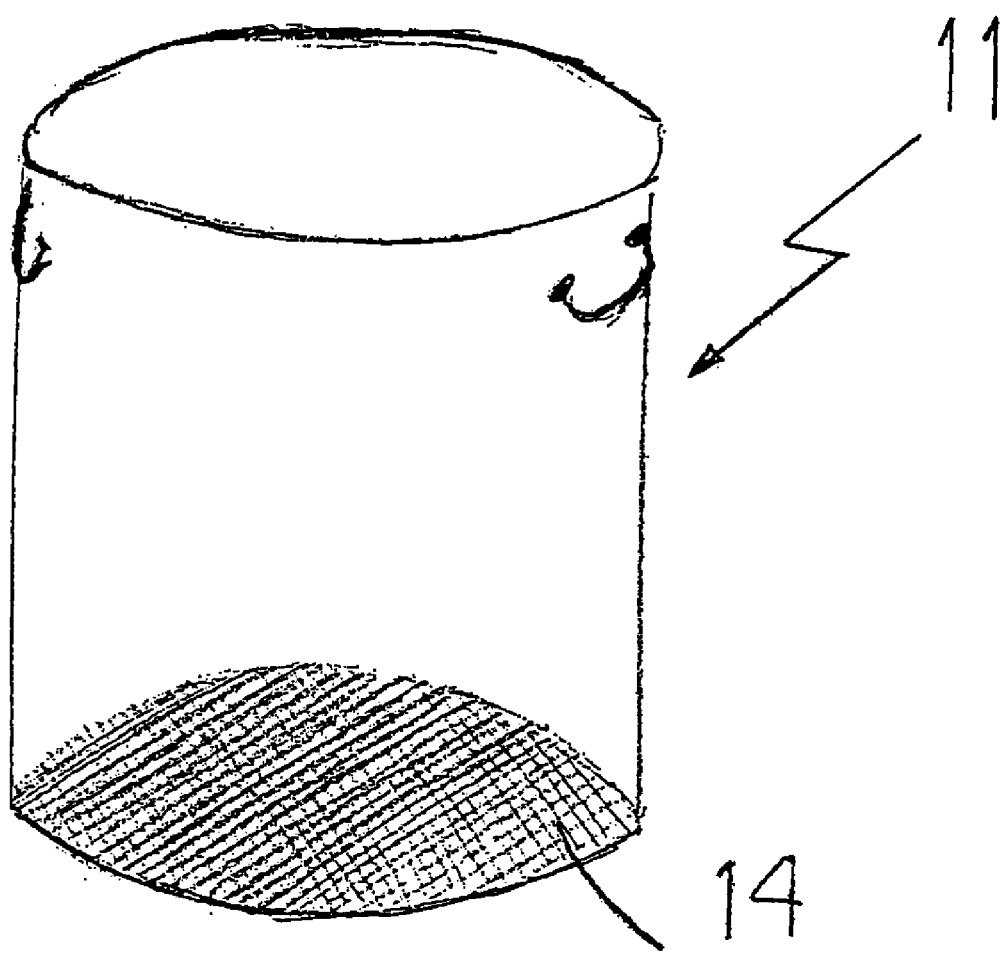
FIG. 2 is an isometric view of the collection container of the present apparatus.

The telescopic feature of the support hollow tube (3) prevents waste to accumulate in the passageway (8) as the encasing sections (3a , 3b, 3c and 3d) are connected to one another in such a way that the upper section is narrower than the lower section and encased in it, preventing feed to accumulate on any surface throughout the passageway while passing from the platform (4) to the collection container (11 in FIG. 2).

In FIG. 2, a collection container (11) includes a metal mesh (14) at the bottom part. The mesh is a common mesh sold in the market and a mesh of a grade, according to its commercial classification, sufficient to enable water to drain while retaining the waste material. Metal or plastic meshes are possible, but landscaping fabric that allows flow of water may also be suitable without straying from the intended scope of the present invention. The roof helps avoid snow from accumulating on the platform and subsequently going down through the passageway to the collection container.

Figure 3:
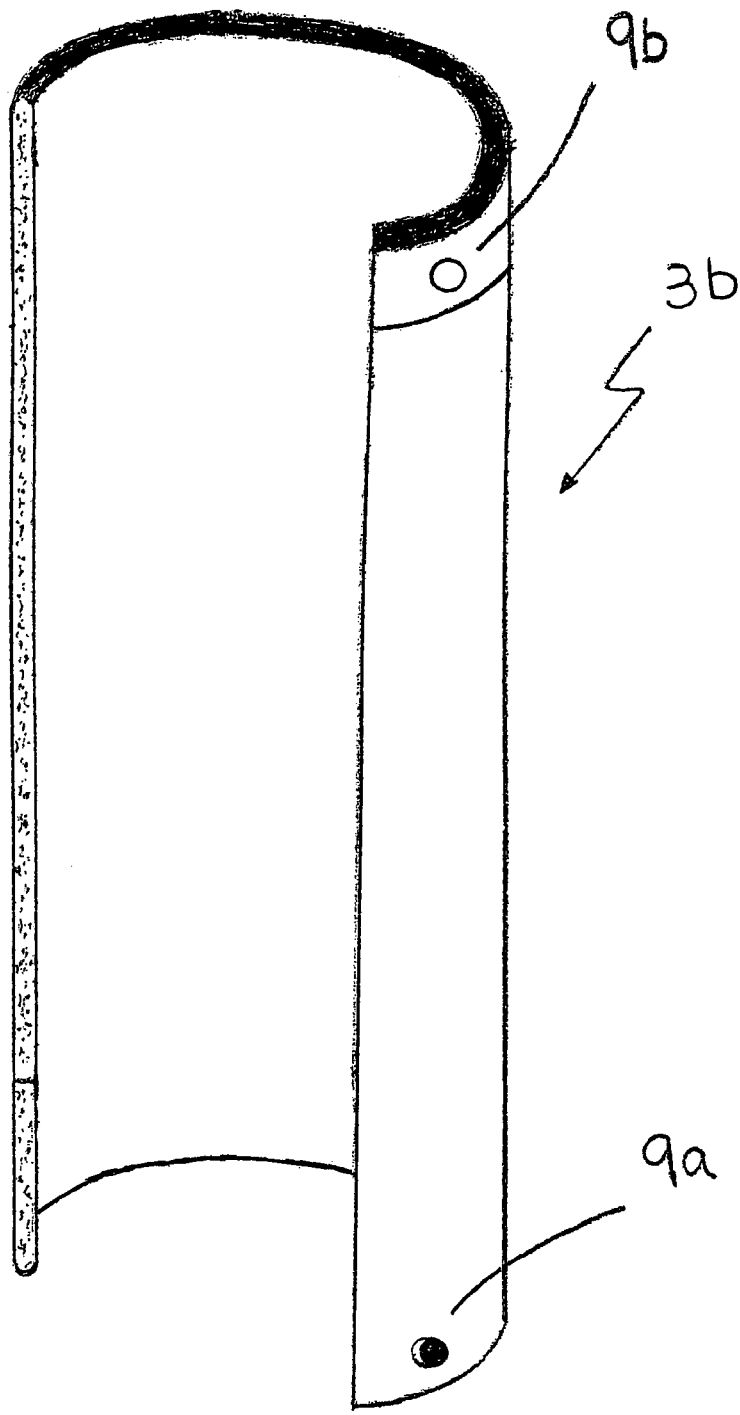
FIG. 3 is a longitudinal partially cut away view of one of the encasing sections of the present apparatus.

In FIG. 3, an encasing section (3b) of the hollow telescopic support tube is provided with pegs at the bottom edge (9a) and holes at the upper edge (9b) to enable the multiple sections and the hollow telescopic support tube (3) to be retained in an extended position.

Figure 4:
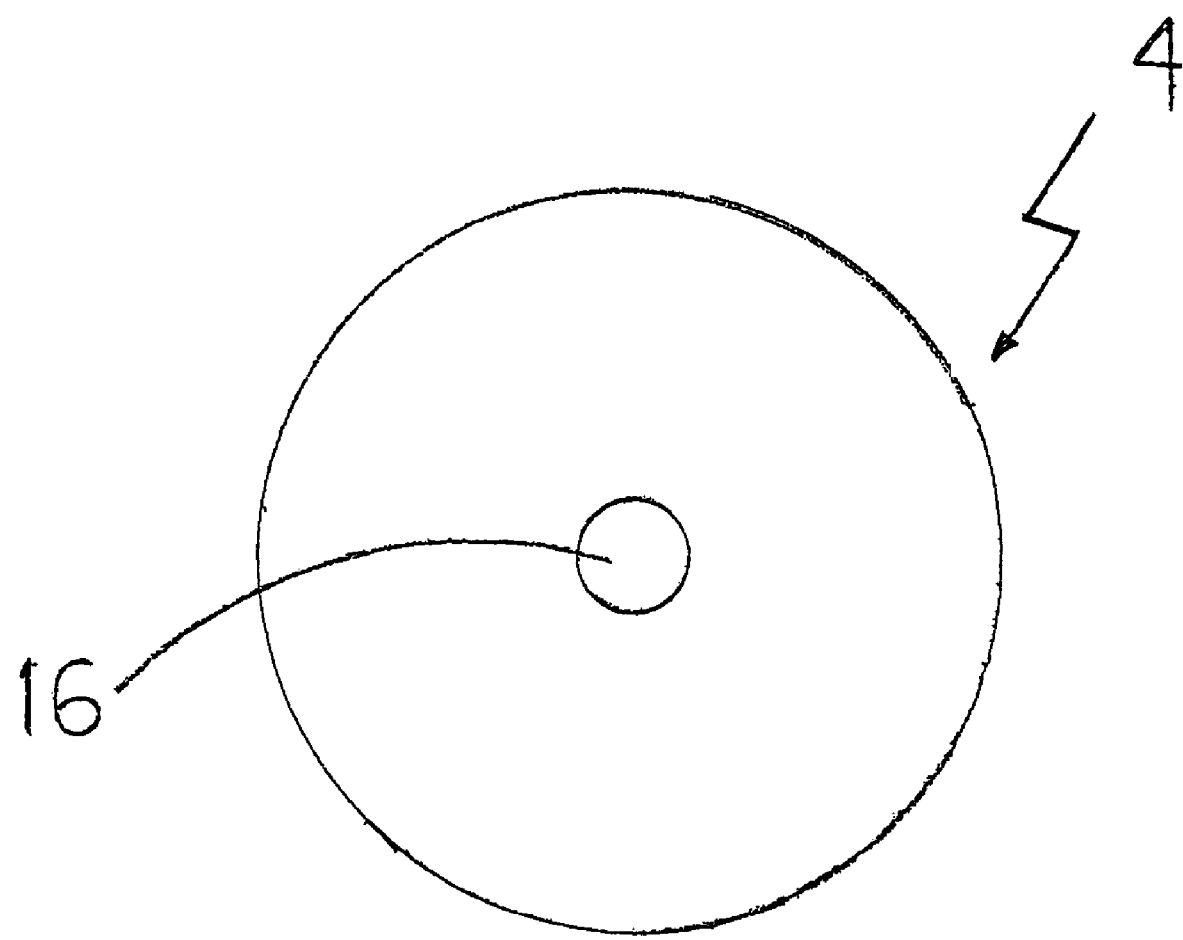
FIG. 4 is an upper view of the saucer-shaped platform of the present apparatus.

In FIGS. 4 and 5, a saucer-shaped platform (4) is bowed down towards the opening (16) within the lower point (20).

Figure 6:
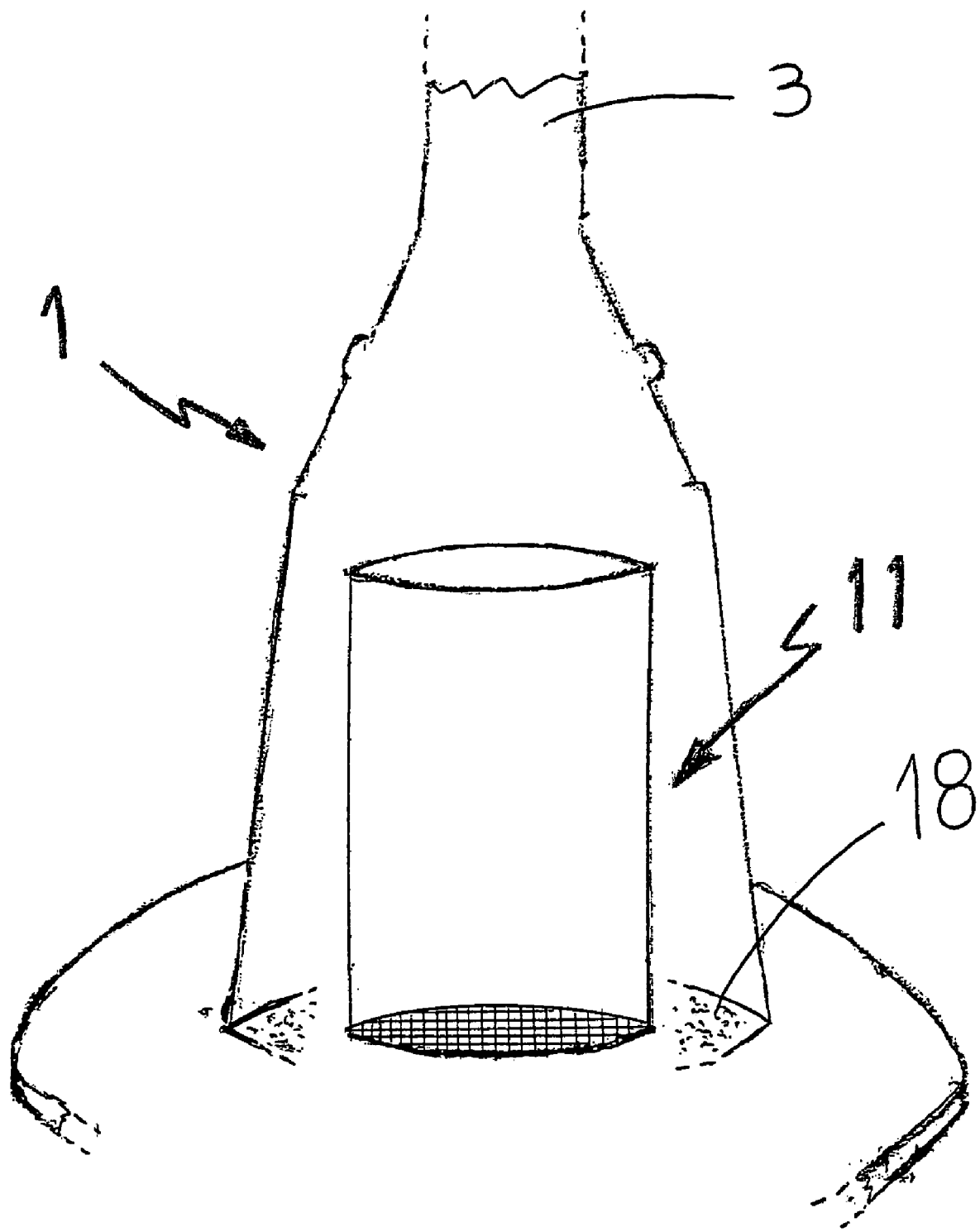
FIG. 6 is an isometric view of the base and the sheltered collection container of the present apparatus.
Figure 7:
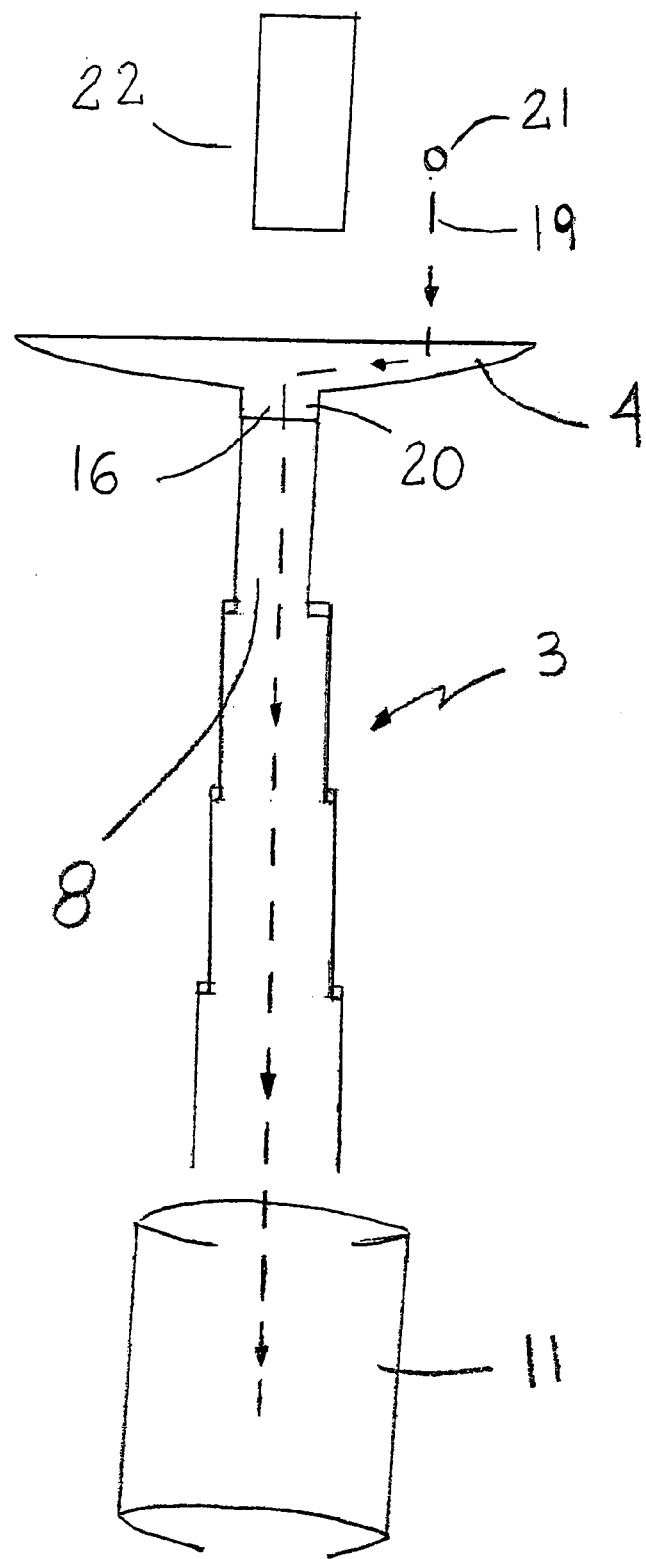
FIG. 7 is a longitudinal partially cut away view of the present apparatus, showing the path from the platform to the collection container via the passageway.

In FIGS. 6 and 7, the operation of the invention is shown, where waste (21) derived from a feeder (22) falls onto the platform (4) preventing the waste from falling on the ground. The waste is then directed to the opening (16) within the lower point (20) and passes through a substantially unobstructed path (19) from the platform (4) to the collection container (11) via the passageway (8) and captured in the collection container (11), which is in contact with the ground (18) and sheltered by the base (1), to receive the waste coming from the hollow supporting tube (3).

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. An outdoor feeder apparatus for wild birds comprising:
   (a) a platform having an upper and lower surface and at least one low point comprising a discharge opening;
   (b) a cover member having an interior surface;
   (c) a plurality of cover support members provided at selected points on the upper surface of the platform to maintain the cover member and platform in a spaced-apart relationship and adapted to provide substantially unimpeded access to the upper surface of the platform from all sides;
   (d) at least one hollow support means each having an inlet opening, constructed and arranged to be attached to the platform at each low point and an outlet opening;
   (e) a base attachable to the hollow support means at the outlet opening;
   (f) a replaceable collection container provided within the base; and
   (g) a bird feeding means; and
   (h) hanging means provided on the interior surface of the cover member for releasably securing the bird feeding means wherein the hollow support means is constructed and arranged to provide in operation an unobstructed substantially vertical downward waste discharge path from each discharge opening to the replaceable collection container.

2. An outdoor feeder apparatus as claimed in claim 1, wherein the hollow support means comprises a telescopic tube, wherein in an operating position
   (i) each section has a larger internal diameter than an immediately higher section, and
   (ii) securing means are provided to retain the sections in a selected position after adjustment.

3. An outdoor feeder apparatus as claimed in claim 1, wherein a ground-facing surface of the base is substantially open.

4. An outdoor feeder apparatus as claimed in claim 3, wherein the base is provided with fixing means to secure it to a supporting surface.

5. An outdoor feeder apparatus as claimed in claim 1, wherein a sidewall of the base comprises access means for selectively removing and replacing the collection container.

6. An outdoor feeder apparatus as claimed in claim 1, wherein the collection container has a water permeable base.

7. An outdoor feeder apparatus as claimed in claim 6, wherein the water permeable base comprises a fine mesh.

8. An outdoor feeder apparatus as claimed in claim 1, wherein dimensions of the platform are selected such that a minimum distance of the perimeter from an outer surface of the hollow support means exceeds a maximum limbspan of animals capable of climbing the hollow support means.

* * * * *